(12) United States Patent
Pickens et al.

(10) Patent No.: US 8,352,474 B2
(45) Date of Patent: Jan. 8, 2013

(54) SYSTEM AND METHOD FOR RETRIEVING INFORMATION USING A QUERY BASED INDEX

(75) Inventors: Jeremy Pickens, Milpitas, CA (US); Matthew Cooper, San Francisco, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 180 days.

(21) Appl. No.: 12/816,943

(22) Filed: Jun. 16, 2010

(65) Prior Publication Data
US 2011/0314026 A1 Dec. 22, 2011

(51) Int. Cl.
*G06F 7/00* (2006.01)
*G06F 17/30* (2006.01)
(52) U.S. Cl. .................................................. 707/741
(58) Field of Classification Search .................. None
See application file for complete search history.

(56) References Cited

U.S. PATENT DOCUMENTS
5,991,751 A * 11/1999 Rivette et al. .................. 1/1
8,024,344 B2 * 9/2011 Bradford .................... 707/739

OTHER PUBLICATIONS

User's Manual for the Examiners Automated Search Tool (EAST) 2.0 Nov. 3, 2003, Computer Sciences Corporation, Version 1.1, 253 Pages.*
Quick Reference Guide for WEST and EAST Jun. 2005, Search and Information Resource Administration (SIRA), 2 pages.*
Pearson—Search Engines: Information Retrieval in Practice, date unknown, Pearson Higher Education, http://www.pearsonhighered.com/product?ISBN=0136072240.*
Azzopardi, L., et al., "Retrievability: An Evaluation Measure for Higher Order Information Access Task," CIKM'08, Oct. 26-30, Napa Valley, Ca, ACM, 10 pgs.
Craswell, N., et al., "Random Walks on the Click Graph," SIGIR'07, Jul. 23-27, Amsterdam, The Netherlands, ACM, 8 pgs.
Croft, B., et al., "Search Engines: Information Retrieval in Practice," Addison Wesley, 2010, 520 pgs.

* cited by examiner

*Primary Examiner* — Jason Liao
(74) *Attorney, Agent, or Firm* — Morgan, Lewis & Bockius LLP

(57) ABSTRACT

A search system generates a plurality of pseudo-documents for a set of documents. Each pseudo-document includes a representation one or more documents from the set of documents that would be retrieved in response to executing a respective basis query over the set of documents. The search system generates an index of the plurality of pseudo-documents. The index provides an indication, for a plurality of respective documents from the set of documents, of the pseudo-documents that include a representation of the respective document. After generating the index, the search system receives a document-query that includes a representation of a first document; and in response to receiving the document-query, the search system identifies one or more pseudo-documents that include representations of at least one document having a predefined relationship to the first document; and generates a result that is based on the first set of one or more pseudo-documents.

21 Claims, 10 Drawing Sheets

SYSTEM AND METHOD FOR RETRIEVING INFORMATION USING A QUERY BASED INDEX

TECHNICAL FIELD

The disclosed embodiments relate generally to retrieving information for a set of documents and more particularly, to generating an index for searching over a set of documents.

BACKGROUND

As the amount of available information increases, efficient and accurate methods of retrieving information are increasingly important. While many approaches to searching through sets of documents have been advanced, such approaches are typically based directly on content of the documents. One common approach is to execute a search query based on one or more terms and to return a list of documents that contain terms from the search query. However, these approaches are of limited utility because they may contain documents that are irrelevant to the query and/or they may fail to include documents that would be useful to the user but do not match the specific search query provided by the user. Additionally, conventional methods of information retrieval fail to provide a simple method of retrieving documents that are similar to a particularly relevant document identified by the user.

SUMMARY

As such, there is a need to improve the accuracy and relevance of search results so as to provide more efficient and accurate methods of retrieving information and to provide a method for retrieving documents that are similar to a particularly relevant document. The above deficiencies and other problems with retrieving information efficiently and accurately are reduced or eliminated by the disclosed system and method of retrieving information using a query based index.

In accordance with some embodiments a method is performed at a computer with one or more processors and memory. The computer generates a plurality of pseudo-documents for a set of documents. Each pseudo-document includes a representation of one or more documents from the set of documents that would be retrieved in response to executing a respective basis query over the set of documents. The computer generates an index of the plurality of pseudo-documents. The index provides an indication, for a plurality of respective documents from the set of documents, of the pseudo-documents that include a representation of the respective document. After generating the index, the computer receives a first document-query that includes a representation of a first document from the set of documents; and in response to receiving the first document-query: the computer identifies a first set of one or more pseudo-documents that include representations of at least one document having a predefined relationship to the first document; and generates a result that is based on the first set of one or more pseudo-documents.

In some embodiments, the result includes basis queries, these recovered basis queries can then be used to retrieve additional documents, or to aid the user in query formulation, selection, and feedback. In some embodiments, the result includes documents associated with the basis queries. In some embodiments, the result includes suggestions for additional terms and/or documents that are relevant to the first document. In many circumstances, the suggested terms and/or documents are significantly more relevant than results that would be retrieved using conventional information retrieval approaches. Thus, computers employing the method of retrieving information using a query based index produce more accurate search results, thereby reducing or eliminating the problems attendant to other approaches to retrieving information. The methods disclosed herein may complement or replace conventional methods for information retrieval.

BRIEF DESCRIPTION OF THE DRAWINGS

Like reference numerals refer to corresponding parts throughout the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known method, procedures, components, circuits and networks have not been described in detail so as not to unnecessarily obscure aspects of the embodiments.

As used herein, the following terms will be used as follows. A "pseudo-document" is a query-based indexable object (e.g., a database entry that is representative of a query executed over a set of documents using a ranking function). A basis query is a query from a predetermined set of queries (e.g., a set of queries that have been executed over a set of documents). A pseudo-document index is an index of query-based indexable objects (e.g., an index that relates a document to queries/ranking functions that retrieve the document from a set of documents). A document-query is a query that includes at least one representation of a document (e.g., a unique document identifier) as a search term (e.g., for searching within the pseudo-document index). An importance metric for a representation of a document within a pseudo-document is a value that corresponds to the importance of the document within the pseudo-document (e.g., the rank of the document within a list of results generated by executing the query/ranking function on a set of documents). A representation of a document is an identifier that uniquely identifies the document within a set of documents (e.g., a unique doc ID, a vector of terms+frequencies, a URL, a URI, a document name, a unique hash of the document, content of the document, raw bits of the document).

Figure 1:
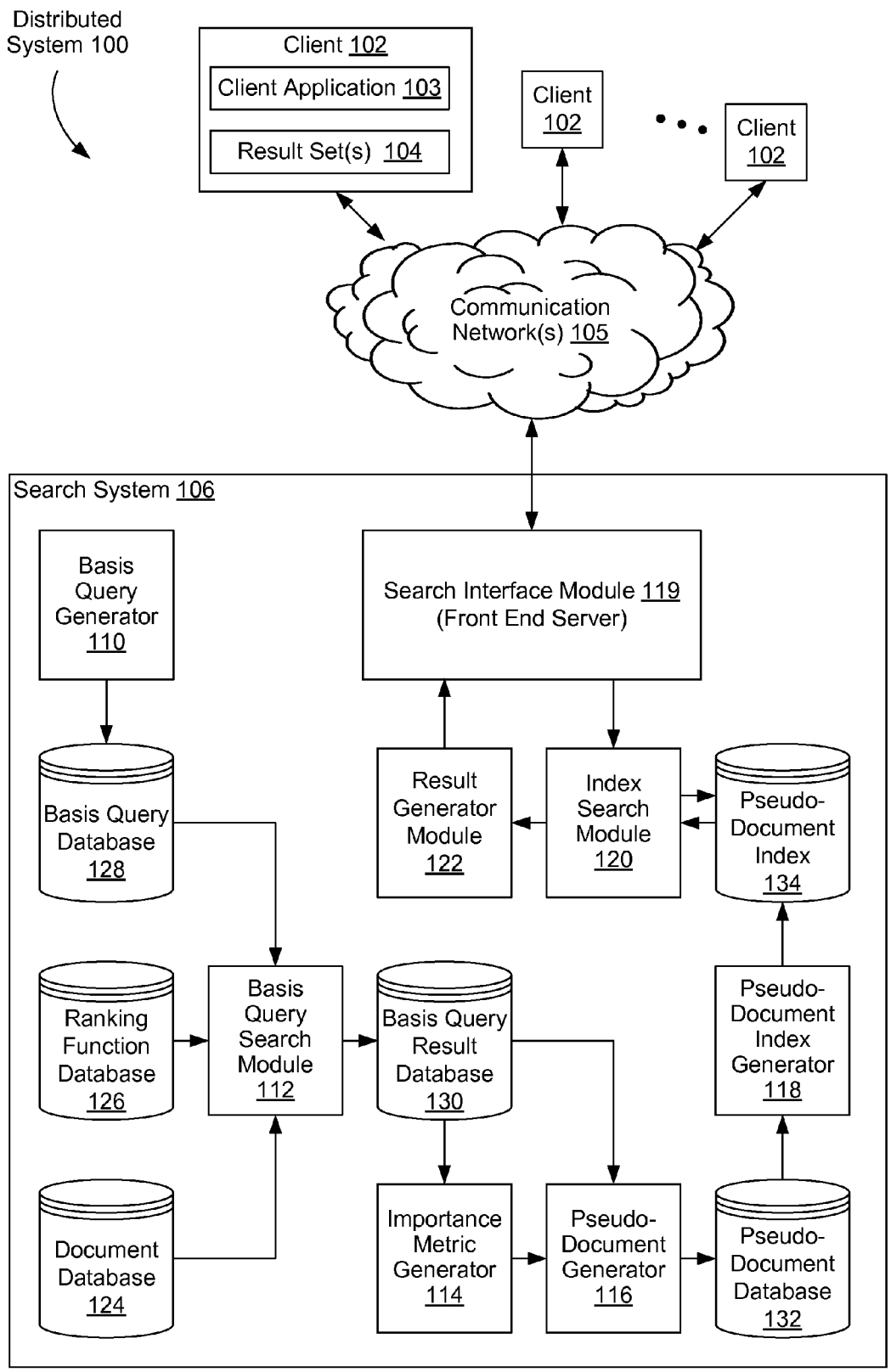
FIG. 1 is a block diagram illustrating an overview a distributed system for retrieving information using a query based index in accordance with some embodiments.

FIG. 1 is a block diagram illustrating the infrastructure of a client-server distributed system according to some embodiments of the invention. The distributed system includes one or more client systems 102 and at least one search system 106 (e.g., a server system including one or more servers that perform indexing and/or search operations). These components are linked together through one or more communication networks 105 (e.g., the Internet, other wide area networks, local area networks, etc.) so that the various components can communicate with each other.

The client system 102 includes a client application 103 (e.g., a web browser). A user can use the client application 103 to submit a query and to receive one or more result sets 104 from the search system 106. The client system 102 (sometimes called the "client device" or "client computer") may be any computer or similar device that is capable of submitting queries and receiving result sets to the search system 106. Examples of client devices include, without limitation, desktop computers, notebook computers, tablet computers, mobile devices such as mobile phones and personal digital assistants, and set-top boxes. Result sets 104 include a set of representations of documents (e.g., a list of document identifiers, a list of links to documents, a group of documents, etc.). In the present application, documents may include virtually any document or content of any format including, but not limited to, text, image, audio, video, etc.

In some embodiments, the search system 106 includes a single server. In other embodiments a search system 106 includes a plurality of servers. The search system 106 includes a plurality of modules for performing operations within the search system 106, the modules including one or more of: a basis query generator 110, a basis query search module 112, an importance metric generator 114, a pseudo-document generator 116, a pseudo-document index generator 118, a search interface module (front end server) 119, an index search module 120 and/or a result generator module 122 which are connected to each other through a local area network (LAN) and exchange information with the client systems 102 through a common interface (e.g., one or more web servers, also called front end servers). In some embodiments where these modules are distributed between a plurality of servers within the search system 106, these servers are connected to each other through a local area network (LAN) or other communication network. The search system 106 also includes a plurality of data structures for storing data used by the search system 106 to perform operations within the search system such as generating an index and searching the index, the data structures (e.g., databases, indices, look-up tables, etc.) including one or more of: a document database 124, a ranking function database 126, a basis query database 128, a basis query result database 130, a pseudo-document database 132, and/or a pseudo-document index 134.

In some embodiments, the basis query generator 110 generates basis queries which are stored in the basis query database 128. In some of these embodiments, the basis query search module 112 uses the basis queries from the basis query database 128 and one or more ranking functions from the ranking function database 126 to perform search operations on a set of documents from the document database 124. In some embodiments, the basis query search module generates basis query results 130 (e.g., stored in a database or a cache in the search system). In some embodiments, the basis query results 130 are retrieved by an importance metric generator 114, and the pseudo-document generator 116 receives basis query results 130 and receives the importance metric data for the documents in the basis query results and generates pseudo-documents using this data. In some of these embodiments, the pseudo-documents are stored in a pseudo-document database 132. The pseudo-document index generator 118 indexes the pseudo-documents from the pseudo-document database 132 so as to generate a pseudo-document index 134.

In some embodiments, the search system 106 receives a search query. In some embodiments, the search query is received from a client 102 (e.g., a search query submitted at the client application 103 at the client 102). In some embodiments, the search query is received from a user interface of the search system 106. In some of these embodiments, the search query is received by the search interface module 119, and passed to the index search module 120 within the search system 106. The index search module 120 executes the received search query on the pseudo-document index 134, and passes the results of the executed search query to the result generator module 122. In some embodiments, the results are passed directly to the client 102 and are prepared for display at the client by the client application 103. In some embodiments, the result generator module 122 prepares the results for display (e.g., generating an ordered list of pseudo-document identifiers for display to a user). The results prepared by the result generator module 122 are passed to the search interface module 119. In some embodiments the search interface module 119 displays the results at the search system 106. In some embodiments, the search interface module 119 passes the results to the client 102 via the communication network 105 for display at the client 102. In some embodiments, the search interface module 119 generates a new search query based on the results and passes the results back to the index search module 120 for further processing.

Figure 3A:
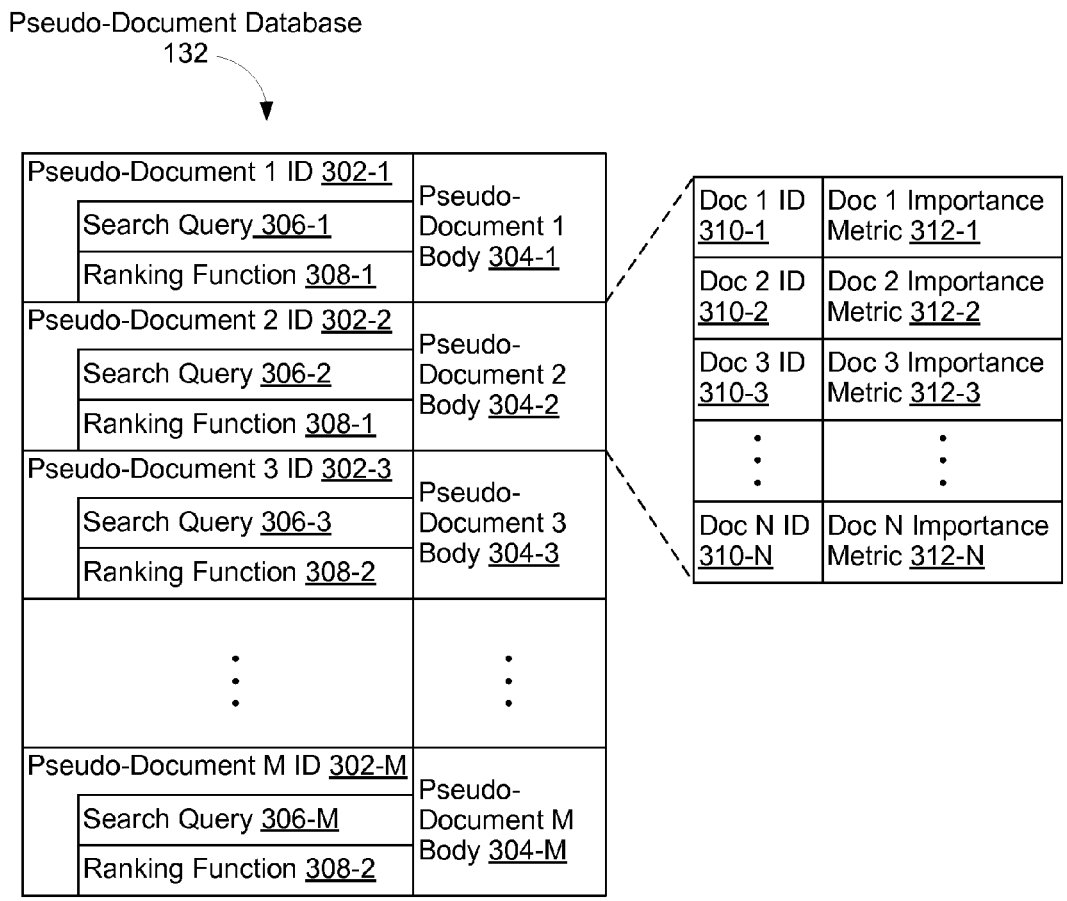
FIG. 3A is a block diagram illustrating exemplary data structures for a pseudo-document database in accordance with some embodiments.
Figure 3B:
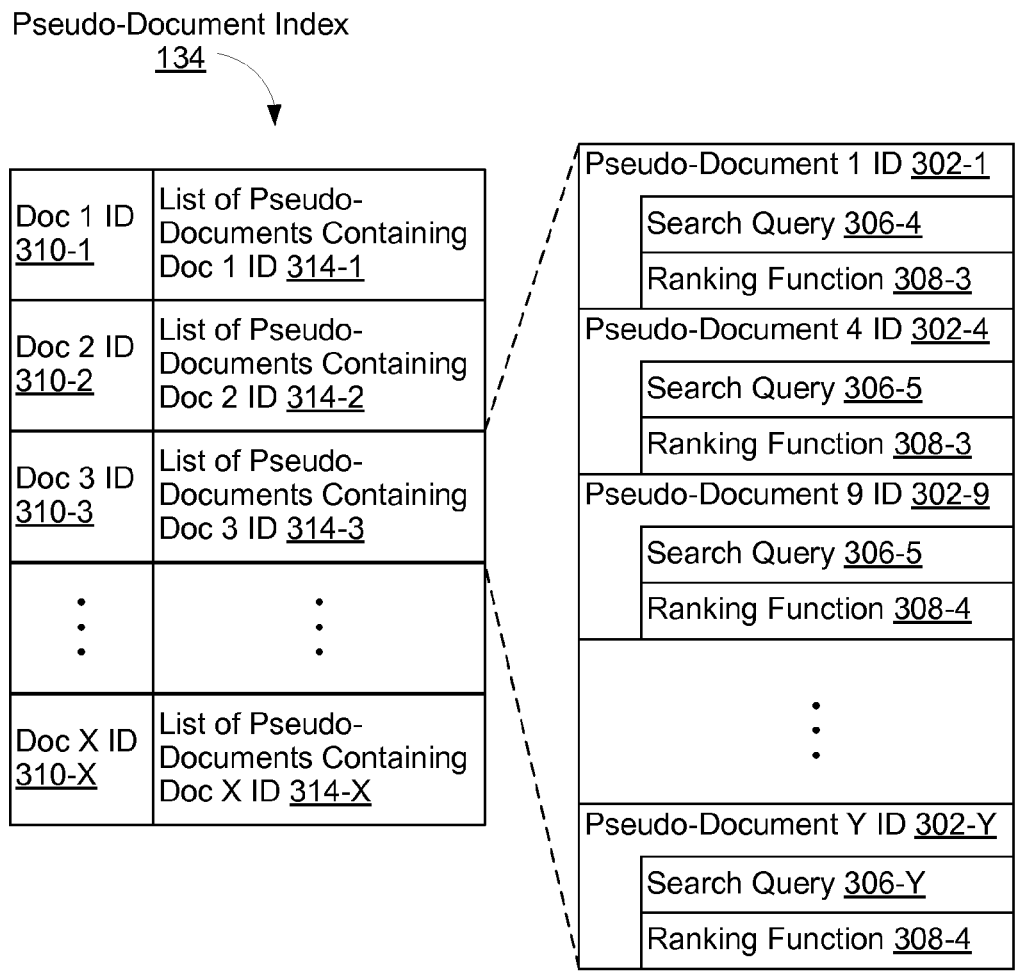
FIG. 3B is a block diagram illustrating exemplary data structures for a pseudo-document index in accordance with some embodiments.
Figure 4A:
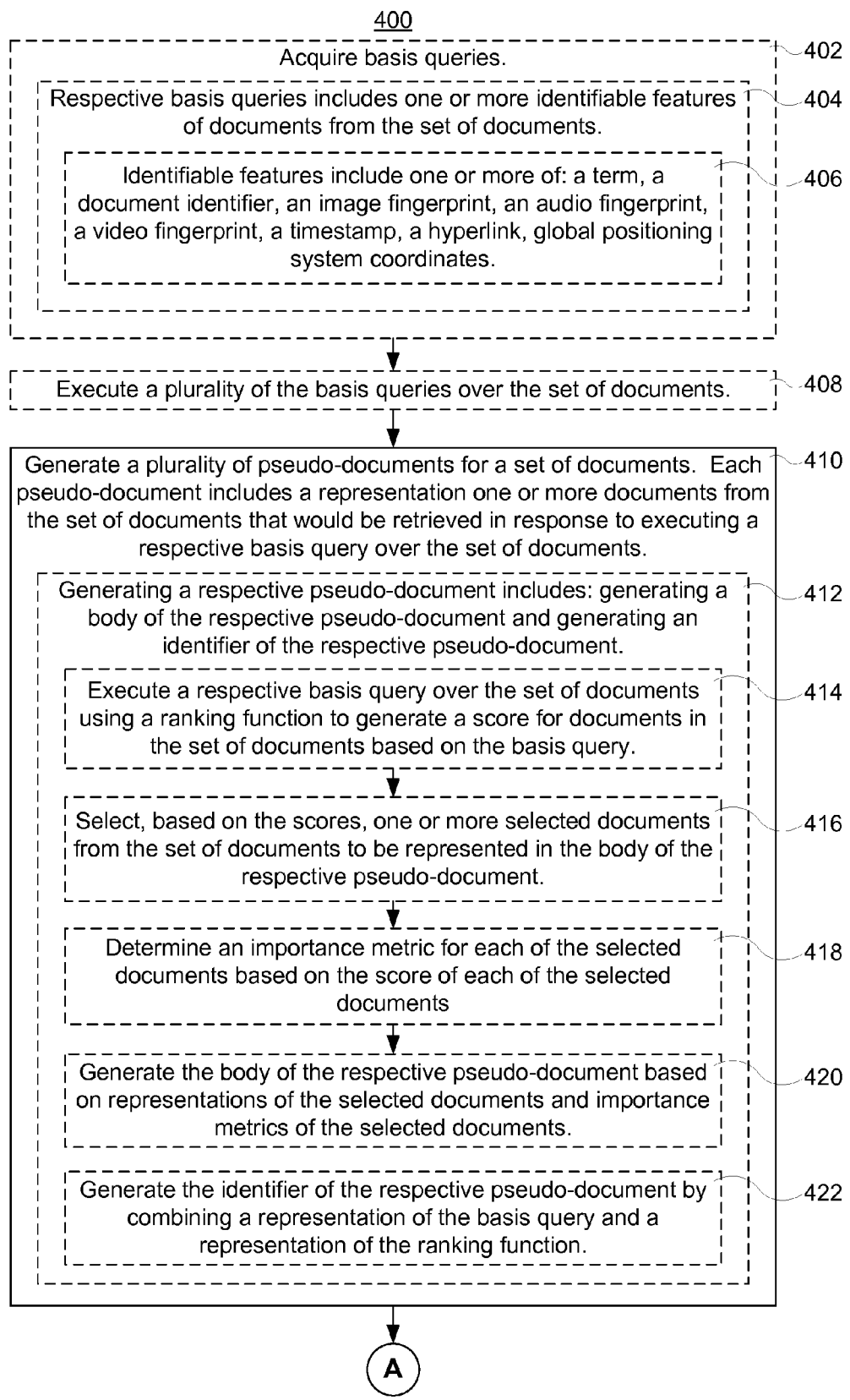
FIGS. 4A-4F are flow charts illustrating a method for retrieving information using a query based index in accordance with some embodiments.
Figure 4B:
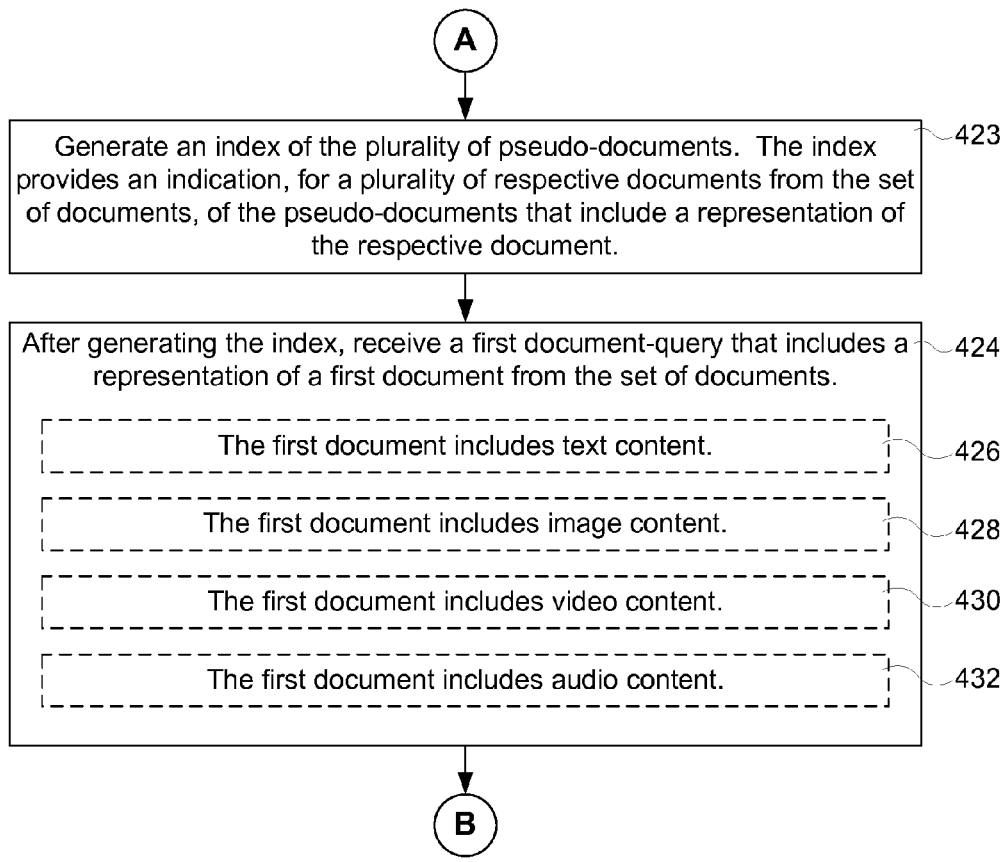
Figure 4C:
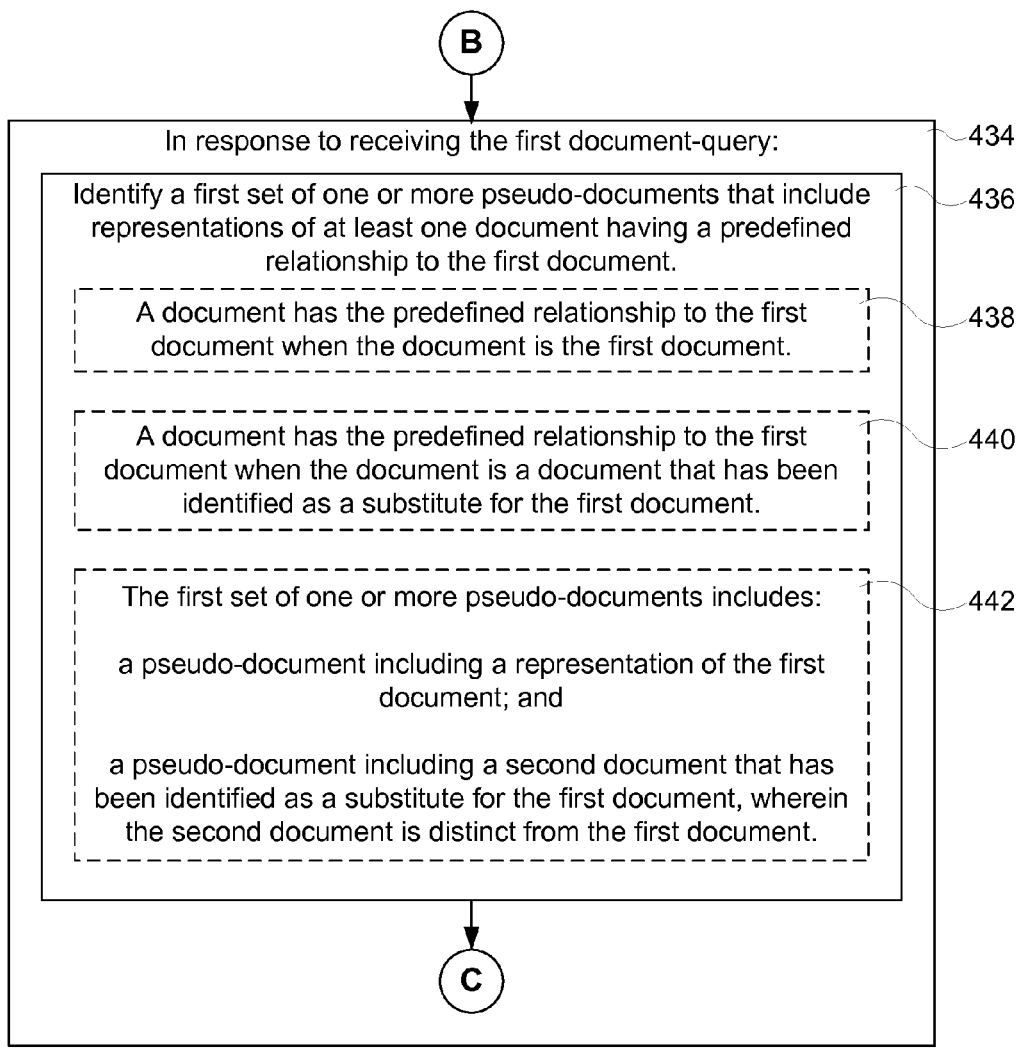
Figure 4D:
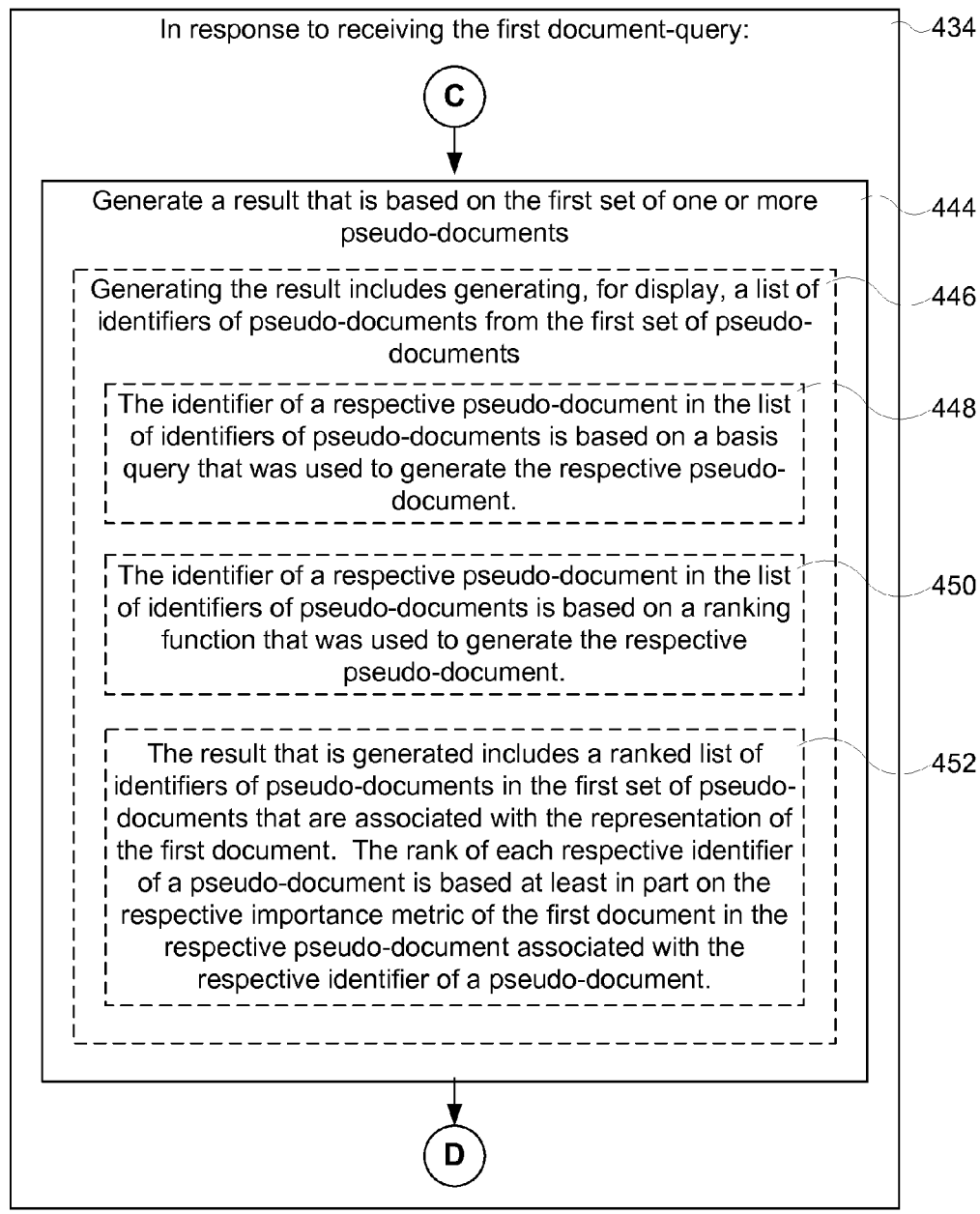
Figure 4E:
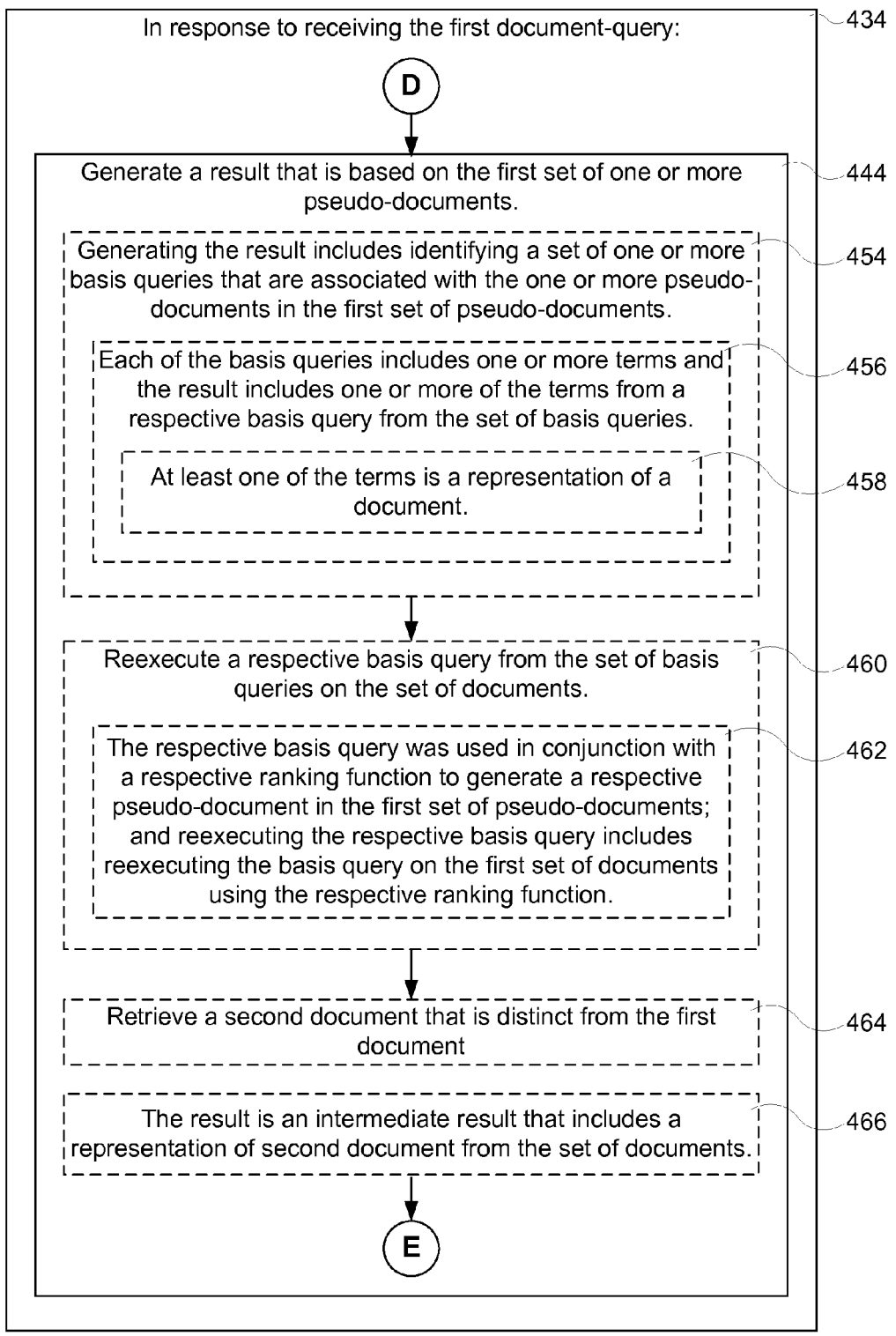
Figure 4F:
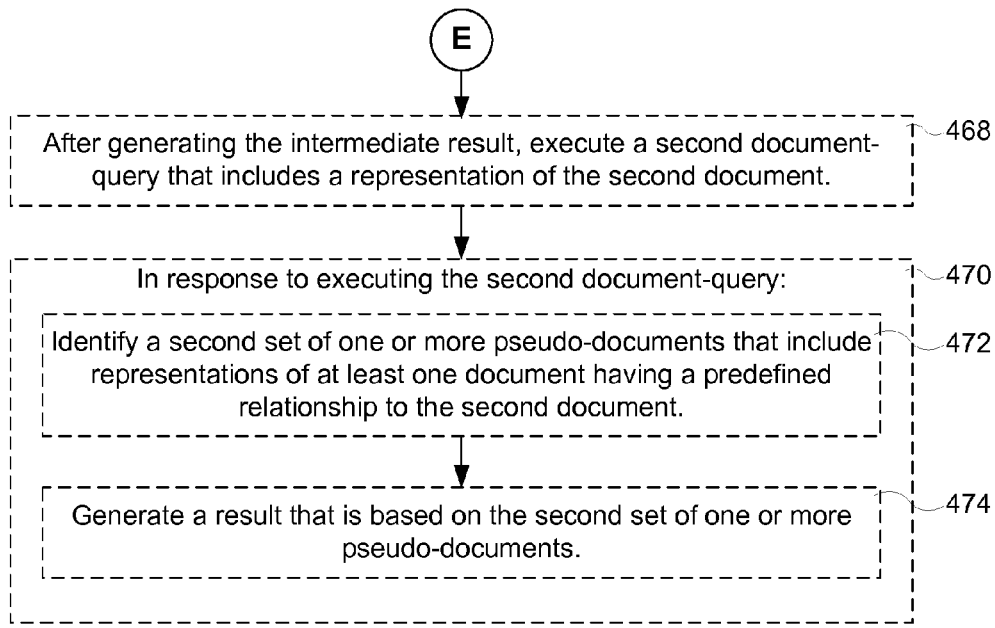

Attention is now directed towards FIG. 2, which shows an embodiment of the search system 106 as a computing device that implements the methods described below and includes one or more processing units (CPU's) 202, one or more network or other communications interfaces 204, memory 206, and one or more communication buses 208 for interconnecting these components. The communication buses 208 may include circuitry (sometimes called a chipset) that interconnects and controls communications between system components. The image analysis system 106 may optionally include a user interface 210. In some embodiments, the user interface 210 includes a display device 212 and/or a keyboard/mouse 214, but other configurations of user interface devices may be used as well. Memory 206 of the search system 106 may include high speed random access memory and may also include non-volatile memory, such as one or more magnetic or optical storage disks, flash memory devices, or other non-volatile solid state storage devices. The high speed random access memory may include memory devices such as DRAM, SRAM, DDR RAM or other random access solid state memory devices. Memory 206 may optionally include mass storage that is remotely located from CPU's 202. Memory 206, or alternately the non-volatile memory device(s) within memory 206, includes a computer readable storage medium. Memory 206 or a computer readable storage medium within memory 206 stores the following elements, or a subset of these elements, and may also include additional elements:

- an operating system 216 that includes procedures for handling various basic system services and for performing hardware dependent tasks;
- a network communication module (or instructions) 218 that is used for connecting the search system 106 to other computing devices via the one or more communications network interfaces 204 and one or more communications networks, such as the Internet, other wide area networks, local area networks, metropolitan area networks, and so on;

applications 220, which include one or more of:
- a basis query generator 110 for generating basis queries to be used when generating pseudo-documents;
- a basis query search module 112 for executing the generated basis queries over a set of documents;
- an importance metric generator 114 for generating importance metrics for the documents in the basis queries based on the relevance of the document within the results of the basis query;
- a pseudo-document generator 116 for generating pseudo-documents using the basis query search results and the generated importance metrics;
- a pseudo-document index generator 118 for generating an index of the pseudo-documents;
- a search interface module 119 for receiving search queries that are directed towards the pseudo-document index 134;
- an index search module 120 for executing received search queries on the pseudo-document index 134; and
- a result generator module 122 for processing the results generated by the index search module 120 and preparing the results for display; and data 222, which includes one or more of:
- a document database 124 for storing one or more sets of documents;
- a ranking function database 126 for storing ranking functions to be sued by the basis query search module 112 when executing basis queries and/or to be used by the index search module 120 when executing search queries on the pseudo-document index 134;
- a basis query database 128 for storing basis queries (e.g., basis queries generated by the basis query generator 110);
- a basis query result database 130 for storing the results produced by the basis query search module 112 executing the basis queries on the set of documents;
- a pseudo-document database 132 for storing the pseudo-documents generated by the pseudo-documents generator 116, as described below in greater detail with reference to FIG. 3A;
- a pseudo-document index 134 for indexing the pseudo-documents generated by the pseudo-document generator 116, as described below in greater detail with reference to FIG. 3B; and
- a cache 224 for temporarily storing information that is required to perform any of the operations or processes described herein.

Figure 2:
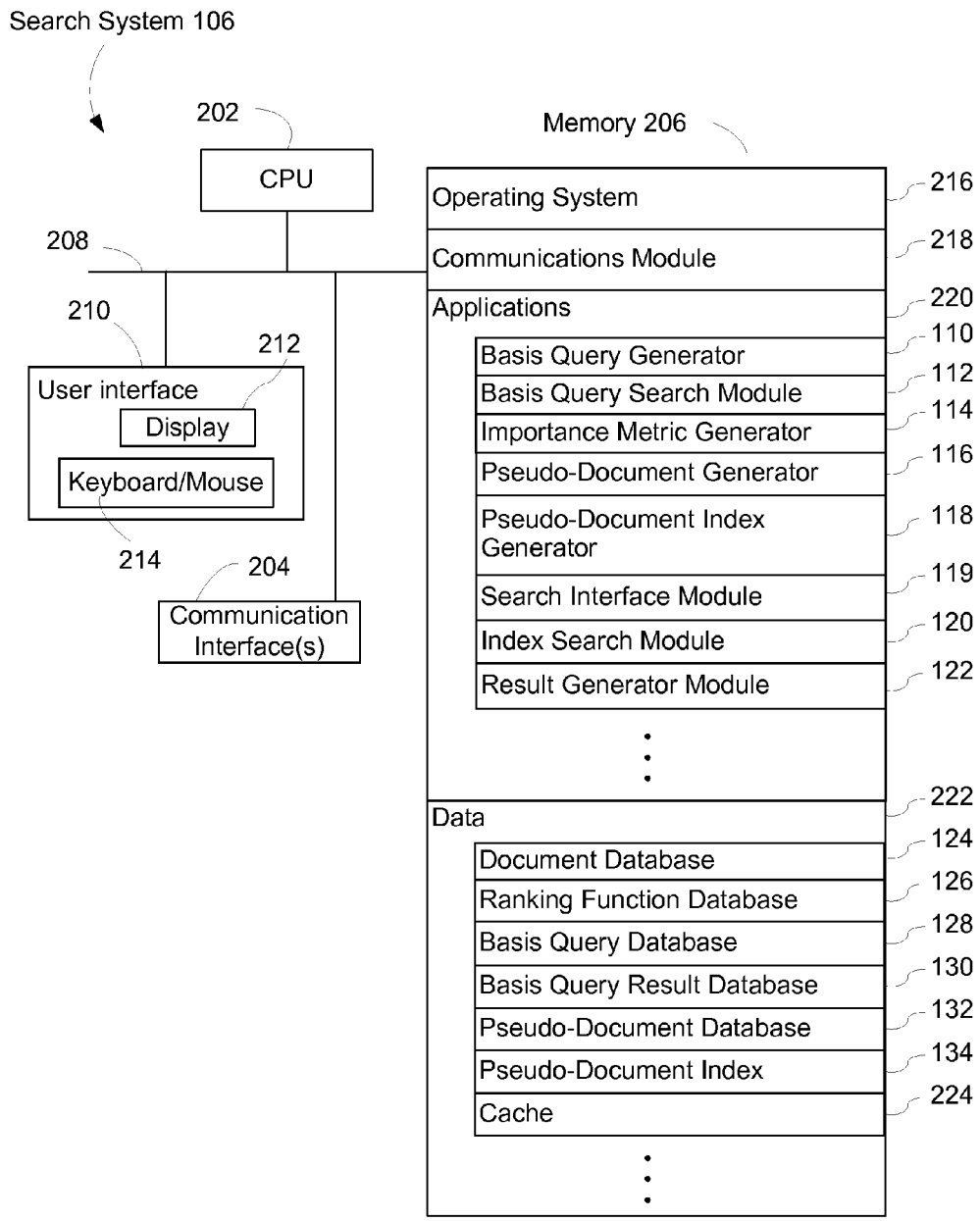
FIG. 2 is a block diagram illustrating a search system for retrieving information using a query based index in accordance with some embodiments.

It should be understood that each of the above identified elements in FIG. 2 may be stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 206 may store a subset of the modules and data structures identified above. Furthermore, memory 206 may store additional modules and data structures not described above. Additionally, while the image analysis system 106 is described above as embodied in a computing device, it should be understood that in some embodiments the image analysis system 106 is implemented as a plurality of interconnected computing devices, and the various functions, modules and data described above are divided between the plurality of interconnected computing systems.

Attention is now directed towards FIG. 3A, which includes a block diagram illustrating exemplary data structures for a pseudo-document database in accordance with some embodiments. In some embodiments, the pseudo-document database 132 has entries for a plurality of pseudo-documents, each entry including a pseudo-document identifier 302 and a pseudo-document body 304. In some embodiments each pseudo-document identifier 302 is generated based on a search query (e.g., a basis query) 306 and/or a ranking function 308 that was used to generate a body 304 of the pseudo-document. For example, pseudo-document 1 has a pseudo-document identifier 302-1 that includes representations of a search query 306-1 and a ranking function 308-1 that were used to generate the pseudo-document body 304-1. Additionally, it should be understood that, in some embodiments, multiple pseudo-document identifiers 302 may be generated based on the same ranking function 308 or the same search query 306 as another pseudo-document identifier, however in these embodiments two pseudo-document identifiers will not be generated using both the same search query and the same ranking function (e.g., the combination of a search query and a ranking function uniquely identify the pseudo-document). In some embodiments, the pseudo-document body (e.g., pseudo-document 2 body 304-2) includes a plurality of representations of documents (e.g., Doc 1 ID 310-1) and associated importance metrics (e.g., Doc 1 Importance Metric 312-1). It should be understood that, in some embodiments, a respective document importance metric is representative of the relevance of a respective document to a respective basis query executed over a set of documents using a respective ranking function. Consequently, in these embodiments, the document importance metric will typically be different, even for the same document, if a different the search query or ranking function is used to generate the pseudo-document.

Attention is now directed towards FIG. 3B, which includes a block diagram illustrating exemplary data structures for a pseudo-document index in accordance with some embodiments. In some embodiments, the pseudo-document index 134 includes entries for one or more of the documents in the set of documents. These entries associate each respective document identifier 310 with lists 314 of pseudo-documents containing the respective document identifier. For example, for a document 3, the representation of document 3 (e.g., Doc 3 ID 310-3) is associated with a list (e.g., 314-3 in FIG. 3B) of pseudo-documents that contain the representation of document 3. Using this index the search system 106 is able to execute the document-query by quickly identifying any pseudo-documents that contain any of the representations of documents (e.g., document identifiers) that were included in the document-query. For example, if the document-query included a representation of document 3 (e.g., Doc 3 ID 310-3), the search system 106 would use the pseudo-document index 134 to determine that pseudo-document 1, pseudo-document 4, pseudo-document 9 and pseudo-document Y each contain a representation of document 3 (e.g., the query/ranking function combination for each of these pseudo-documents would retrieve the representation of document 3 from the set of documents).

Attention is now directed towards FIGS. 4A-4F, which include a description of the method 400 of retrieving information using a query based index (e.g., pseudo-document index 134 in FIGS. 1, 2 and 3B) in accordance with some embodiments.

The search system described below operates over a set of documents. It should be understood that the search system may store multiple sets of documents and even operate in parallel over multiple sets of documents. However, the embodiments below will be discussed primarily with reference to a single set of documents so as not to unnecessarily obscure other aspects of the described embodiments. In some embodiments, each document is associated with a representation of the document (e.g., each document is given a unique identifier). In some embodiments the representations of the documents are assigned (e.g., document identifiers assigned in numerical order or based on timestamps). In some embodiments, the representations of the documents are generated based on the content of the documents (e.g., each document identifier is a unique document hash or a document name).

In some embodiments, the search system 106 acquires (402) a plurality of basis queries. In some embodiments, the basis queries are received at the search system 106 and stored in the basis query database 128 in FIGS. 1 and 2. In some embodiments, the basis queries are manually generated (e.g., a user manually creates in basis queries). In some embodiments, the basis queries are automatically generated (e.g., by the basis query generator 110 in FIGS. 1 and 2). As an example of automatically generated basis queries, the basis queries may include: all singleton (unique) text strings found in the set of documents; all bigrams (e.g., units consisting of two consecutive text strings) found in the set of documents; all trigrams (e.g., units consisting of three consecutive text strings) found in the set of documents; all n-grams (e.g., units consisting of n consecutive text strings, where n is any integer) found in the set of documents; the set of all metadata features in a collection (e.g. document geographic location, creation time and date, last access time and date, and so forth); and/or arbitrary conjunctions and disjunctions of text strings and metadata (e.g. a singleton text string combined with a geographic location). As another example, the set of basis queries can be generated from the queries that have been previously been executed over the set of documents (e.g., search queries retrieved from existing user logs). Moreover, it should be understood that when basis queries are generated from logs of basis queries, result selection data (e.g., clickthrough statistics where the result is a list of hyperlinks) can be used to determine the relevance of each of the documents to the basis query. In other words, result selection data can be used in addition to or instead of the ranking of the documents within the search results by a ranking function to determine which documents in are the most relevant documents for a respective basis query.

In some embodiments, the respective basis query includes (404) one or more identifiable features of documents from the set of documents. In some embodiments, the identifiable features include (406) one or more of: a term, a document identifier, an image fingerprint, an audio fingerprint, a video fingerprint, a timestamp, a hyperlink, global positioning system coordinates. In other words, it should be understood that, while the examples above relate particularly to text documents, the basis queries described herein also apply to other types of documents, such as images, audio files, video files, representations of physical objects (e.g., using location coordinates, etc.).

In some embodiments, prior to generating the plurality of pseudo-documents, the search system 106 (e.g., basis query search module 112 in FIGS. 1 and 2) executes (408) a plurality of the basis queries over the set of documents. It should be understood that executing a basis query over a set of documents typically includes evaluating a match between the basis query and documents in the set of documents using a ranking function. For example a text string can be used to identify documents with similar text strings, a text string can be used to identify an image with metadata that matches the text string, an image can be used to find similar images, an audio snippet can be used to find other audio content with similar aural properties. An exemplary list of types of basis queries that can be executed over a set of documents using a ranking function to retrieve results of a particular type is provided in Table 1 below. Additionally, it should be understood that, in addition to such content-based ranking functions, result selection data (e.g., user clickthrough rates on a list of hyperlinks) could be used to determine the relevance of a document to a basis query.

TABLE 1

Exemplary basis query types for retrieving results using ranking functions.

| Basis Query | Ranking Function | Result Type |
| --- | --- | --- |
| text string | TF.IDF | text document |
| text string | Language Modeling/KL Divergence | text document |
| text string | Vector Space Model | text document |
| image | earth mover distance on color histogram | image |
| image | earth mover distance on luminance histogram | image |
| image | detect and rank by facial similarity | image |
| point in time | closest in time | any |
| geographic location | nearest in distance | any |
| audio snippet | timbral similarity | audio |
| music snippet | rhythmic similarity | music |

In some embodiments, all of the basis queries are performed using a single ranking function. For example, for a set of text documents, a TF.IDF (Term Frequency/Inverse Document Frequency) ranking function is used in conjunction with a set of basis queries that include text strings (e.g., a set of the 100,000 most popular text queries from user logs), and these results for each of these queries would be stored as a pseudo-document, as described in greater detail below. In some embodiments, the basis queries are performed using multiple different ranking functions. For example, for a set of documents of mixed type (e.g., a set of documents including text documents, images, videos, etc.) text queries could be performed using both a TF.IDF ranking function and a Language Modeling ranking function, while image queries are performed using an earth mover distance on color histogram ranking function, and these results for each combination of a basis query and ranking function would be stored as a separate pseudo-document, as described in greater detail below. It should be noted that the ranking function can dramatically modify the results of a search query (e.g., the color histogram ranking function is very different from the face detection and similarity ranking function) consequently, performing the same basis query (e.g., an image query) using a first ranking function (e.g., the color histogram ranking function) will, under some circumstances produce a dramatically different set of results or ordering of results than using a second ranking function (e.g., the face detection and similarity ranking function) even when the same image query is executed over the same set of documents.

Moreover, it should be understood that the type of basis query does not necessarily dictate the type of result that will be returned. For example, a text string query could retrieve text documents, images and videos. As another example, an image query could retrieve similar images and text documents that are related to the image query. Additionally, a timestamp query (e.g., finding documents that have a most recent timestamp or a timestamp that is closest to a predefined timestamp) could return a result including any type of document from the set of documents.

The search system 106 generates (410) a plurality of pseudo-documents for a set of documents (e.g., by processing the basis query result data from the basis query result database 130 in FIGS. 1 and 2). Each pseudo-document includes a representation of one or more documents from the set of documents that would be retrieved in response to executing a respective basis query over the set of documents. In other words, each of the basis queries is executed individually over the collection, and each set of results for each of the basis queries is ranked by at least one ranking function (e.g., by ranking the representations of the documents within each set of results in accordance with the ranking function). However, it should be understood that, in some embodiments, a single basis query may be executed using multiple ranking functions either to generate a single set of results or to generate multiple different sets of results (e.g., in some embodiments, there is one set of results for each unique basis query/ranking function pair).

It should be understood that the pseudo-document can be any representation of a set of search results that is capable of being indexed. In other words, a pseudo-document is a way of representing search results such that the search results can be indexed on a per-document basis. While the subsequent examples are described primarily with reference to creating a logical entity that represents each search query and set of results from the search query, which can be treated as a document, thereby simplifying the indexing process, other representations of search results are contemplated, which would have different advantages and drawbacks.

In some embodiments, generating a respective pseudo-document includes generating (412) a body of the respective pseudo-document and generating an identifier of the respective pseudo-document (e.g., as illustrated by the pseudo-documents described with reference to FIG. 3A above). In other words, in some embodiments, the pseudo-document is generated in a form that emulates a real document, so that the pseudo-document can more easily be indexed.

In some embodiments, the search system 106 generates a body of the respective pseudo-document by performing operations 414-420. The search system 106 (or basis query search module 112 in FIGS. 1 and 2) executes (414) a respective basis query over the set of documents using a ranking function to generate a score for documents in the set of documents based on the basis query. The search system 106 (or pseudo-document generator 116 in FIGS. 1 and 2) selects, (416) based on the scores, one or more selected documents from the set of documents to be represented in the body of the respective pseudo-document. The search system 106 (or importance metric generator 114 in FIGS. 1 and 2) determines (418) an importance metric for each of the selected documents based on the score of each of the selected documents. The search system 106 (or pseudo-document generator 116 in FIGS. 1 and 2) generates (420) the body of the respective pseudo-document based on representations of the selected documents and importance metrics of the selected documents.

In other words, the search system 106 executes the basis query to produce a list of documents that are relevant to the search query and scores the documents using the ranking function. In some embodiments, these scores are used to determine the relevance of the documents to the search query. Representations of the documents (e.g., document identifiers) are added to the pseudo-document in accordance with the scores from the ranking function. In some embodiments, the raw scores produced by the ranking function are used as the importance metric for each of representations of the documents. In some embodiments, the representations of the documents are ordered based on the raw scores produced by the ranking function and the order of the documents is used as an importance metric for the documents. The representations of the documents and the importance metrics for the documents are used to construct the body of the pseudo-document. As one example, document identifiers for the one hundred most relevant documents in a set of search results (e.g., as determined by the ranking function scores) are included in the body of the pseudo-document and the rank of each of the documents within the set of results is included in the document as an importance metric associated with the document identifier for the document. As another example, document identifiers for the one hundred most relevant documents in a set of search results (e.g., as determined by the ranking function scores) are included in the body of the pseudo-document and the score of each of the documents within the set of results is included in the pseudo-document as an importance metric associated with the document identifier for the document. Other methods of constructing the body of the pseudo-document are contemplated (e.g., creating a text document where each document identifier is repeated a number of times that is based on the importance metric associated with the document, etc.). It should be understood that the importance metrics are typically generated on a per document and per search query basis (e.g., each document identifier within a pseudo-document has an importance metric that is specific to the document, the search query and the ranking function used to generate the search results).

It should be understood that, in some embodiments, indexing a document requires the determination of features of the document such as a length of the document and a frequency of occurrence of terms within a document. However, in accordance with some embodiments, the pseudo-document described herein does not have a length or a term frequency. Thus, it is necessary to specify these values in accordance with the importance metrics discussed above. Thus, in some embodiments, a pseudo-frequency of terms and a pseudo-length of the document are defined based on the importance metric (e.g., so that the pseudo-document can emulates a real document and can thus be indexed more easily). In some of these embodiments, the pseudo-frequency of a representation of a document within the pseudo-document is defined to be the importance metric of the representation of the document. In some embodiments, the pseudo-length of the pseudo-document is defined to be the sum of the importance metrics for all of the representations of documents within the pseudo-document. In some embodiments, the pseudo-length of the pseudo-document is defined to be the number of unique representations of documents that are included in the body of the pseudo-document.

It should be understood that, in some embodiments, indexing a document requires a unique identifier for the pseudo-document. While, in principle, any unique identifier can be used, as described in greater detail above, in some embodiments, generating (422) the identifier of the respective pseudo-document includes combining a representation of the basis query and a representation of the ranking function. For example, if the search query consists of the term "elephant" and the ranking function is TF.IDF, the pseudo-document identifier could be generated by simply combining the search term and the name of the ranking function as "elephant_TF.IDF." Similarly, it should be understood that if only a single ranking function is used to generate all of the pseudo-documents, the pseudo-document identifier could be based solely on the search query (e.g., in the example above, the pseudo-document identifier could be "elephant").

In some embodiments, the plurality of pseudo-documents is updated (e.g., by adding or removing one or more pseudo-documents from the pseudo-document database 132 in FIGS. 1-2 and 3A). In some embodiments, the plurality of pseudo-documents are updated in response to changes to the collection of documents (e.g., the addition or removal of documents from the collection of documents). For example, when one or more new documents are added to the document database (e.g., 124 in FIGS. 1 and 2), those new documents may change the results of the basis queries, and thus the basis queries are re-executed over the documents in the document database so as to produce updated pseudo-documents. It should be understood that, in some embodiments, when a document is added to the document database only a subset of the pseudo-documents are updated (e.g., by re-executing the basis queries over the documents in the document database so as to generate pseudo-documents as described in greater detail above), so as to conserve computing resources. Similarly, in some embodiments, the pseudo-documents (or a subset of the pseudo-documents) are not updated until at least a predefined quantity of change has occurred in the document database (e.g., 5% of the documents have been added and/or removed from the document database), so as to conserve computing resources.

In some embodiments, the plurality of pseudo-documents is updated in response to changes to the basis queries (e.g., the addition or removal of basis queries from the plurality of basis queries). For example, when a new basis query is added to the basis query database (e.g., 128 in FIGS. 1 and 2), either because a new basis query has been generated by the basis query generator 110 in FIGS. 1-2 or because a new basis query has been identified in the user logs, a new pseudo-document is generated, as described in greater detail above, by executing the new basis query over the documents in the document database. It should be understood that, in accordance with some embodiments, when a basis query is removed from the plurality of basis queries, the pseudo-document(s) associated with that basis query is/are removed from the pseudo document database (e.g., 132 in FIGS. 1-2 and 3A) and the pseudo document index (e.g., 134 in FIGS. 1-2 and 3B).

The search system 106 (or pseudo-document index generator 118 in FIGS. 1 and 2) generates (423) an index of the plurality of pseudo-documents, the index provides an indication, for a plurality of respective documents from the set of documents, of the pseudo-documents that include a representation of the respective document. In other words, the pseudo-document index is analogous to a document index where the representations of the documents are analogous to terms in a document and the pseudo-documents are analogous to documents. Thus, for each respective representation of a document (e.g., each document identifier) the pseudo-document index includes a list of pseudo-documents that contain the respective representation of the document (e.g., as illustrated in the exemplary pseudo-document index 134 shown in FIG. 3B).

After generating the index, the search system 106 receives (424) a first document-query that includes a representation of a first document from the set of documents. It should be understood that a document-query is a query that uses one or more representations of documents (e.g., document identifiers) as the search terms. Additionally, it should be understood that in some embodiments the document query includes terms that are not representations of documents (e.g., text strings, timestamps, location coordinates etc.).

It should be understood that there are virtually no restrictions on the type of document that is used for the document-query. In other words, the representation of the first document can be a representation of any document that is in the first set of documents. In some embodiments, the first document includes (426) text content. In some embodiments, the first document includes (428) image content. In some embodiments, the first document includes (430) video content. In some embodiments, the first document includes (432) audio content.

The search system 106 (or by the index search module 120 in FIGS. 1 and 2) executes the document-query over the pseudo-document index. It should be understood that the document-query can be executed over the pseudo-document index using any ranking function for retrieving results from an index (e.g., a standard ranking function such as Best Match, language model, vector space model, etc.). In particular, the creation of a plurality of pseudo-documents that include many of the features of a document and then indexing the plurality of the pseudo-documents as described above is advantages in that it enables a user to employ many different ranking functions and index searching strategies that also apply to searching standard document indices that are created by indexing documents. One of ordinary skill in the art will readily understand how to enhance many of the conventional search approaches by applying the search approaches to executing search queries over the pseudo-document index as described herein. An example of such conventional search approaches is provided by Search Engines: Information Retrieval in Practice, Bruce Croft, Donald Metzler, and Trevor Strohman (Addison Wesley, 2009), which is hereby incorporated by reference in its entirety.

Additionally, it should be understood that the document-queries may be boolean, and may use standard query operators such as synonym operators (e.g., SYN(cats, cat)=>"cats is a synonym of cat") and position operators (e.g., PHRASE-5(cat, dog)=>"cat within 5 words of dog"). Again, the creation of a plurality of pseudo-documents that include many of the features of a document and then indexing a plurality of the pseudo-documents as described above is advantages in that it enables a user to use query operators that are typically used to retrieve documents using a conventional word based search to retrieve pseudo-documents. One example of a document-query is: (DOCID-1 AND DOCID-2) OR (DOCID-3 AND DOCID-4), which requires that results (e.g., identified pseudo-documents) must either contain representations of both documents 1 and 2, or contain representations of both documents 3 and 4. Another example of a document-query is: (DOCID-1 AND NOT DOCID-2), which requires that results (e.g., identified pseudo-documents) must contain representations of document 1 but not representations of document 2. Another example of a document query is SYN(DOCID-1, DOCID-2, DOCID-3) OR DOCID-4, which requires that the document have a representation of one of documents 1, 2, or 3 or a representation of document 4. In this example, representations of documents 1, 2 and 3 are treated as synonyms, which has implications for the results of some ranking functions and will consequently affect the ranking of the results of the document-query. Another example of a document-query is: PHRASE-K(DOCID-1, DOCID-2), which requires that representations of documents 1 and 2 must appear within the pseudo-document within a window size K of each other, thus the most relevant pseudo-documents will be pseudo-documents created from basis queries that retrieve documents 1 and 2 at similar relative positions, whether those positions are high (e.g., 1-5), middle (e.g., 50-55), or low (95-100).

Operations 436-466 are performed in response to receiving (434) the first document-query. The search system 106 (or index search module 120 in FIGS. 1 and 2) identifies (436) a first set of one or more pseudo-documents (e.g., using the pseudo-document index 134 in FIGS. 1, 2 and 3B) that include representations of at least one document having a predefined relationship to the first document. In other words, the search system 106 identifies pseudo-documents that are responsive to the document-query (e.g., pseudo-documents that include one or more of the document identifiers in the document-query). In some embodiments the first set of one or more pseudo-documents are ranked based on the relevance of the pseudo-documents to the document-query.

In some embodiments, a document has (438) the predefined relationship to the first document when the document is the first document. In some embodiments, a document has (440) the predefined relationship to the first document when the document is a document that has been identified as a substitute for the first document. It should be understood that, in accordance with some embodiments, identifying a document as a substitute for the first document includes making a determination that the substitute document is a replacement for the first document or is in some way equivalent to the first document. Additionally, in some embodiments, identifying a document as a substitute for the first document includes making a determination that the substitute document is a version of the first document or is otherwise related to the first document. Once a document has been identified as a substitute document for the first document, a search for the first document will retrieve results related to the first document and results related to the substitute document, while a search for the substitute document will retrieve results related to the substitute document and results related to the first document.

In other words, in some embodiments, representations of two or more documents are treated as synonyms by the search system 106 (e.g., when a user enters a document identifier for a first document, the search system 106 determines that the first document is substantially similar to a substitute document and thus performs a search using a document identifier for the first document and a document identifier for the substitute document as synonyms). In some embodiments the document-query specifies that the representations of the two or more documents are to be treated as synonyms. In some embodiments, the document-query only includes a first document identifier and the search system 106 automatically identifies one or more documents that are substitutes for the first document and defines the identifiers for the first document and the identifiers for the substitute documents as synonyms. In some embodiments, the search system 106 includes a synonym database that includes information on documents that are substantially similar to each other which has been previously created (e.g., either by the search system 106 or by another computer or a human). In some embodiments, the search system 106 uses statistical methods to determine whether two documents are substitutes. As one example of such a search, a user enters a document-query that includes a document identifier for a live concert recoding of a Grateful Dead song. In this example, the search system identifies a document that is a studio recording of the same Grateful Dead song and performs a search on the pseudo-document index using the document identifier for the concert recording and the document identifier for the studio recording as synonyms. Continuing this example, the search system 106 will retrieve pseudo-documents that include the document identifier for the concert recording and/or the document identifier for the studio recording.

In some embodiments, the first set of one or more pseudo-documents includes (442): a pseudo-document including a representation of the first document; and a pseudo-document including a second document that has been identified as a substitute for the first document, where the second document is distinct from the first document. In other words, in the example described above, the set of pseudo-documents identified by the search system 106 as responsive to the search query includes at least one pseudo-document that includes both the document identifier for the concert recording of the Grateful Dead song and the document identifier for the studio recording of the Grateful Dead song.

The search system 106 (or result generator module 122 in FIGS. 1 and 2) generates (444) a result that is based on the first set of one or more pseudo-documents. In other words, the search system 106 takes the set of pseudo-documents that are responsive to the document-query and generates a result using those pseudo-documents. In some embodiments, generating a result that is based on the first set of one or more pseudo-documents includes presenting the set of pseudo-documents to a user. In some embodiments, the set of pseudo-documents are organized in a list and ranked. However, it should be understood that once the set of pseudo-documents has been retrieved using the document-query, the pseudo-documents and/or the basis queries and ranking functions represented by the pseudo-documents may be used in a number of ways. In some embodiments, the basis queries that were used to generate the pseudo-documents are used as query suggestions, as query expansions, and so forth (e.g., by providing the user with a list of terms that were used to form the basis queries for the top 10 pseudo-documents in the set of pseudo-documents). In some embodiments, the basis queries that were used to generate the pseudo-documents are used to automatically generate new queries, which are subsequently re-executed on the pseudo-document index to retrieve a new set of pseudo-documents.

In some embodiments, generating the result includes generating (446), for display, a list of identifiers of pseudo-documents from the first set of pseudo-documents. In other words, a document-query including one or more representations of documents (e.g., document identifiers) is executed over the pseudo-document index, a set of the pseudo-documents are identified, and a list of the pseudo-documents is generated. In some embodiments, this list is ranked based on a relevance of the pseudo-documents to the document-query, so that the most relevant pseudo-documents are listed closer to a beginning of the list.

It should be understood that, in some embodiments, the identifier of a respective pseudo-document in the list of identifiers of pseudo-documents is based on (448) a basis query that was used to generate the respective pseudo-document. Consequently, in some embodiments, generating a list of identifiers of pseudo-documents for display includes generating a list of search queries that are relevant to the received document-query (e.g., search queries which returned documents whose document identifiers are part of the search query). For example, a document-query that included DOCID-1 would return a list of basis queries that include terms that are found within the document associated with DOCID-1. In some embodiments, the identifier of a respective pseudo-document in the list of identifiers of pseudo-documents is based on (450) a ranking function that was used to generate the respective pseudo-document. As discussed in greater detail above, the ranking function that is used to generate a pseudo-document can have a dramatic impact on the result of executing a basis-query. As such, in some embodiments, the identifier of the pseudo-document includes a representation of the ranking function, and thus the list of identifiers of pseudo-documents also includes representations of the ranking functions used to generate those pseudo-documents. For example, a document-query that included DOCID-1 would return a list of ranking functions that were used in conjunction with basis queries to retrieve the document associated with DOCID-1. Additionally, it should be understood that in some embodiments, the identifier of each pseudo-document is based on both a basis query and a ranking function (e.g., as illustrated in FIG. 3A above). In some embodiments, the identifier of each pseudo-document is based on either a basis query or a ranking function.

In some embodiments, the result that is generated includes (452) a ranked list of identifiers of pseudo-documents in the first set of pseudo-documents that are associated with the representation of the first document, and the rank of each respective identifier of a pseudo-document is based at least in part on the respective importance metric of the first document (e.g., or a representation of the first document, such as a document ID) in the respective pseudo-document associated with the respective identifier of a pseudo-document. In other words, the list of pseudo-documents that is produced in response to receiving a document-query is ranked based on the importance of documents whose document identifiers were included in the document-query. For example, for a single term document-query that includes DOCID-1, the search system 106 would produce a list of pseudo-documents that include DOCID-1, where the pseudo-documents are ranked within the list based on the position of DOCID-1 within the basis query search results that were used to generate the pseudo-document. Thus, an identifier for a first pseudo-document that was generated from a basis query that had a set of results where DOCID-1 was presented as a first ranked result would be placed higher on the ranked list of identifiers of pseudo-documents than an identifier for a second pseudo-document that was generated with a basis query that had a set of results where DOCID-1 was presented as a fiftieth ranked result. In some embodiments, the results are ranked using an inverse document frequency approach, where the importance metric is a proxy for the frequency with which a document occurs within a pseudo-document. In other words, in some embodiments, the list of pseudo-document identifiers is ranked based on an inverse document frequency ranking using the pseudo-length of each of the pseudo-documents and the pseudo-frequency for each representation of a document within the pseudo-documents, as described in greater detail above. The process of applying inverse document frequency techniques to a set of documents where each document has terms with respective frequencies and a document length is well known in the art, for example, see Search Engines: Information Retrieval in Practice, Bruce Croft, Donald Metzler, and Trevor Strohman (Addison Wesley, 2009) which is hereby incorporated by reference in its entirety. As such further details of performing inverse document frequency analysis will not be described herein so as not to unnecessarily obscure the other described embodiments.

In some embodiments, generating the result includes identifying (454) a set of one or more basis queries that are associated with the one or more pseudo-documents in the first set of pseudo-documents. In some embodiments, each of the basis queries includes (456) one or more terms and the result includes one or more of the terms from a respective basis query from the set of basis queries. In other words, in some embodiments, the results are not a list of pseudo-document identifiers, but rather the search system 106 identifies one or more basis queries that are associated with the pseudo-documents that were identified in response to the document-query.

These identified basis queries can then be decomposed into terms which are provided to the user. It should be understood that in some embodiments, at least one of the terms is (458) a representation of a document. Thus, these terms can be provided to the user as suggestions for additional terms to add to a future document-query. However, in some embodiments, these terms are text strings, timestamps, location coordinates, or other terms that were used to generate the basis queries. These terms can serve as a description of documents whose document identifiers were part of the document-query or can be used as suggestions for additional terms to be used in a standard query over the set of documents or another set of documents. In other words, returning terms to the user instead of a list of pseudo-documents provides the user with generalized information about terms that are associated with the document-query, without requiring the user to manually examine the contents of the pseudo-documents.

In some embodiments, the search system 106 reexecutes (460) a respective basis query from the set of basis queries. In other words, after identifying the first set of one or more pseudo-documents, the search system 106 identifies a respective basis query that was used to generate one of the pseudo-documents. As one example, the search system 106 identifies a first ranked pseudo-document in a list of pseudo-documents that was produced in response to the document-query and identifies the basis query that was used to generate the first ranked pseudo-document. It should be understood that, in some of these embodiments, the respective basis query was used in conjunction with a respective ranking function to generate (462) a respective pseudo-document in the first set of pseudo-documents; and reexecuting the respective basis query includes reexecuting the basis query on the first set of documents using the respective ranking function (e.g., the search system 106 uses the same ranking function that was used to generate the first ranked pseudo-document when reexecuting the respective basis query).

In response to reexecuting the respective basis query, the search system 106 retrieves (464) a second document (e.g., a document that was retrieved by reexecuting a respective basis query from the set of basis queries on the set of documents). In some embodiments, the second document is distinct from the first document. In other words, the search system 106 receives a document-query including a representation of a first document, retrieves basis queries that retrieved the first document, and reexecutes the basis queries so as to produces a representation of a second document as the search result. Consequently, users are able to search for documents that are similar to a document by simply providing a document identifier for the document, rather than by searching using text terms or other conventional search approaches. For example, if a user has a song that he likes (e.g., a Grateful Dead studio recording of a song) the user can search for other similar songs by simply submitting a document-query to the search system 106 that uses the identifier of the song, and the search system 106 will produce a set of results (e.g., a ranked list) that include similar songs and/or documents associated with the song (e.g., a live concert recording of the Grateful Dead song, a studio recording of a different Grateful Dead song, a discography of the Grateful Dead, a fan website of the Grateful Dead, an album cover for the album that contains the studio recording of the song, etc.).

In some embodiments, the result is (466) an intermediate result that includes a representation of second document from the set of documents. In some embodiments, after generating the intermediate result, the search system 106 executes (468) a second document-query that includes a representation of the second document. In some of these embodiments, operations 472-474 are performed in response to executing the second document-query. In some of these embodiments, the search system 106 identifies (472) a second set of one or more pseudo-documents that include representations of at least one document having a predefined relationship to the second document; and generates (474) a result that is based on the second set of one or more pseudo-documents. In other words, in some embodiments, the search system iterates the method described above by taking the results of the document-query and using those results to generate a new document-query and subsequently executing the new document-query and proving results of the new document-query to the user. For example, if the initial document query is an identifier of a studio recording of a Grateful Dead song, and the results are identifiers for a live concert recording of the Grateful Dead song, a studio recording of a different Grateful Dead song, a discography of the Grateful Dead, a fan website of the Grateful Dead, an album cover for the album that contains the studio recording of the song, the search system 106 performs a broader search for any pseudo-document that includes any of these representations of documents, thereby automatically and intelligently broadening the document-query provided by the user, so as to provide a broader range of results that are still relevant to the user.

It should be understood that the methods described above typically provide superior results to conventional methods of searching, as illustrated in the extended example provided below. For this example, a standard set of documents is used to compare a standard relevance feedback method and the query based indexing (e.g., using the pseudo-document index described above). For the purposes of this evaluation, a test collection generated by the Text REtrieval Conference (TREC) is used. This test collection includes predefined relevance judgments (i.e., correct answers) which enable the accuracy of a search method to be evaluated. In a first example, a test collection for topic 301, "international organized crime" is searched using both a baseline method (e.g., a conventional relevance feedback algorithm) and the query based indexing method described above. Using the baseline method, the top 10 terms produced are, in order: crime, organized, criminal, mafia, groups, dia, gangs, russian, cri, and weapons. In contrast, the top 10 terms produced (in order) by query based indexing (e.g., using the pseudo-document index described above) are: mafia, organized, crime, criminal, extortion, gangs, bosses, prostitution, blackmail, and racketeering.

Thus, from the exact same test collection of relevant documents, both the baseline method and the query based indexing (e.g., using the pseudo-document index described above) method picked up the same top terms, i.e. mafia, organized crime, and criminal. But beyond those top terms, the baseline method picked up on terms related to Russia and weapons trafficking, whereas the query based indexing (e.g., using the pseudo-document index described above) approach picked up on terms related to prostitution, extortion, and blackmail. Consequently, the query based indexing (e.g., using the pseudo-document index described above) approach provides results that are much more relevant than conventional techniques for searching a collection of documents.

It should be understood, that, as described in greater detail above, there are several means by which queries may be retrieved using documents as queries. For example, by presenting the retrieved queries to the user for manual query selection or expansion, or by allowing the user to manually construct complex document-queries for more accurate automatic expansion using the retrieved queries (e.g., using the boolean or other query logic described above). However, for the purpose of this extended example a simple test was performed, a side-by-side comparison using TREC topics 301-450 and standard TREC relevance judgments (i.e., a standard set of "correct answers") on those topics. As a baseline method, standard relevance feedback query expansion were used. In this baseline method, a query is run, the top k documents returned by that query are judged for relevance, and then the most discriminative terms from any relevant documents found are weighted and added back to the original query, which is then used in a second round of retrieval. For a baseline search method, a KL divergence algorithm for discriminative term selection and weighting was used (e.g., as implemented in the Terrier open source retrieval platform (available at http://ir.dcs.gla.ac.uk/terrier/)).

This baseline method was tested against the query based indexing (e.g., using the pseudo-document index described above) approaching as follows. For each term-based query in which relevant documents were found among the top k, those same exact relevant documents are used as a Best Match (BM25) document-query pseudo-document index. (This pseudo-document index was constructed using automatically-extracted 1-grams as queries). The top results from these document-based queries are then added back to the original term-based query, with their importance metrics (e.g., raw retrieval scores) used as weights for a second round of retrieval.

The two conditions have been controlled for consistency. In the baseline method, a term must have a document frequency of at least 2 in order to be considered for expansion. In the query based indexing (e.g., using the pseudo-document index described above) approach, the exact same terms are used to form the basis of the indexing; each query term must appear in at least two documents.

In the following tables (e.g., Table 2 and Table 3), the first (left) column is the baseline method, the second column is the query based indexing (e.g., using the pseudo-document index described above) method, the third column is the percent-change of the query based indexing method over the baseline method, and the fourth column is the statistical significance, as calculated by a T-test. The * indicates significance at a 0.05 level. The Queryid (Num) row indicates the number of topics used (averaged) in the values given. Note that because only topics in which at least one relevant document was found in the k documents that are judged were compared, this number is typically less than the 150 total topics used, and will also grow as the judgment depth increases. The Rel_ret row indicates the total number of relevant documents that were returned by each search technique. Precision is also given as a function of the number of documents (e.g., 5 documents, 10 documents, etc.). Finally, mean average precision is also shown.

In a first experiment, illustrated in Table 2 below, ten expansion terms are added to the query and the user is assumed to have judged the top ten documents for relevance. In this experiment standard TREC relevance judgment set is used in place of the user to provide a measure of relevance. If no relevant documents are found in the top ten, that topic is not used, as neither the baseline nor the query based indexing approach have any relevant documents to work from.

TABLE 2

First experiment, 10 expansion terms, 10 top documents judged for relevance

| Queryid (Num): | 108 | 108 | % Chg | t-test |
|---|---|---|---|---|
| Retrieved: | 108000 | 108000 | | |
| Relevant: | 10334 | 10334 | | |

TABLE 2-continued

First experiment, 10 expansion terms, 10 top documents judged for relevance

| Queryid (Num): | 108 | 108 | % Chg | t-test |
|---|---|---|---|---|
| Rel_ret: | 5558 | 5787 | +4.12 | 0.0392* |
| Precision | | | | |
| At 5 docs: | 0.5130 | 0.5426 | +5.8 | 0.1583 |
| At 10 docs: | 0.4556 | 0.4759 | +4.5 | 0.1867 |
| At 15 docs: | 0.4123 | 0.4321 | +4.8 | 0.1680 |
| At 20 docs: | 0.3815 | 0.4028 | +5.6 | 0.0892 |
| At 30 docs: | 0.3284 | 0.3543 | +7.9 | 0.0187* |
| At 100 docs: | 0.2101 | 0.2164 | +3.0 | 0.2946 |
| At 200 docs: | 0.1474 | 0.1546 | +4.9 | 0.0372* |
| At 500 docs: | 0.0848 | 0.0886 | +4.5 | 0.0531 |
| At 1000 docs: | 0.0515 | 0.0536 | +4.1 | 0.0392* |
| Mean Avg. Precision (non-interpolated) | 0.1787 | 0.1908 | +6.82 | 0.0560 |

In a second experiment, only ten expansion terms are added to the query from each method, but this time, the user is assumed to have judged the top twenty documents for relevance. In this experiment standard TREC relevance judgment set is used in place of the user to provide a measure of relevance. This means that more relevance information is available, but this additional information is still available to both the baseline and the new query based indexing (e.g., using the pseudo-document index described above) method. As illustrated in Table 3 below, the query based indexing (e.g., using the pseudo-document index described above) method is better at utilizing this additional information to produce more relevant results.

TABLE 3

First experiment, 10 expansion terms, 20 top documents judged for relevance

| Queryid (Num): | 120 | 120 | % Chg | t-test |
|---|---|---|---|---|
| Retrieved: | 120000 | 120000 | | |
| Relevant: | 11907 | 11907 | | |
| Rel_ret: | 5909 | 6367 | +7.75 | 0.0004* |
| Precision | | | | |
| At 5 docs: | 0.4833 | 0.5000 | +3.4 | 0.3790 |
| At 10 docs: | 0.4025 | 0.4367 | +8.5 | 0.0262* |
| At 15 docs: | 0.3533 | 0.3911 | +10.7 | 0.0054* |
| At 20 docs: | 0.3267 | 0.3721 | +13.9 | 0.0002* |
| At 30 docs: | 0.2886 | 0.3322 | +15.1 | 0.0000* |
| At 100 docs: | 0.1959 | 0.2122 | +8.3 | 0.0038* |
| At 200 docs: | 0.1382 | 0.1505 | +8.9 | 0.0004* |
| At 500 docs: | 0.0808 | 0.0866 | +7.1 | 0.0021* |
| At 1000 docs: | 0.0492 | 0.0531 | +7.8 | 0.0004* |
| Mean Avg. Precision (non-interpolated) | 0.1458 | 0.1667 | +14.34 | 0.0001* |

These results show that even at ten judged documents, the query based indexing (e.g., using the pseudo-document index described above) outperforms the baseline method. However, when more relevance information is available, the improvements (and statistical significance) are even more dramatic, increasing to 14.34% or higher mean average precision.

The steps in the information processing methods described above may be implemented by running one or more functional modules in information processing apparatus such as general purpose processors or application specific chips. These modules, combinations of these modules, and/or their combination with general hardware (e.g., as described above with respect to FIG. 2) are all included within the scope of protection of the invention.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method comprising:
at a search system with one or more processors and memory:
obtaining a plurality of pseudo-documents for a set of documents, wherein each pseudo-document in the plurality of pseudo-documents:
corresponds to a respective set of search results generated by executing a respective basis query over the set of documents; and
includes document identifiers for one or more documents in the respective set of search results;
generating an index of the plurality of pseudo-documents, wherein the index provides an indication, for each of a plurality of respective documents from the set of documents, of the pseudo-documents that include a document identifier for the respective document;
after generating the index, receiving a first document-query that includes a representation of a first document from the set of documents; and
in response to receiving the first document-query:
identifying, using the index, a first set of one or more pseudo-documents that include a document identifier of at least one document having a predefined relationship to the first document;
identifying a first set of basis queries corresponding to pseudo-documents in the first set of one or more pseudo-documents; and
generating a result that is based on the first set of basis queries.

2. The method of claim 1, wherein a document has the predefined relationship to the first document when the document is at least one of: the first document and a document that has been identified as a substitute for the first document.

3. The method of claim 1, wherein, the first set of one or more pseudo-documents includes:
a first pseudo-document including a document identifier of the first document; and
a second pseudo-document including a document identifier of a second document that has been identified as a substitute for the first document, wherein the second document is distinct from the first document.

4. The method of claim 1, wherein the first document includes content selected from the set consisting of: text, images, video and audio.

5. The method of claim 1, wherein the respective basis query includes one or more identifiable features of documents from the set of documents.

6. The method of claim 5, wherein the identifiable features include one or more of: a term, a document identifier, an image fingerprint, an audio fingerprint, a video fingerprint, a timestamp, a hyperlink, global positioning system coordinates.

7. The method of claim 1, further comprising prior to generating the plurality of pseudo-documents, executing a plurality of the basis queries over the set of documents.

8. The method of claim 1, wherein generating a respective pseudo-document includes generating a body of the respective pseudo-document and generating an identifier of the respective pseudo-document.

9. The method of claim 8, wherein generating a body of the respective pseudo-document includes:
- executing a respective basis query over the set of documents using a ranking function to generate a score for documents in the set of documents based on the basis query;
- selecting, based on the scores, one or more selected documents from the set of documents to be represented in the body of the respective pseudo-document;
- determining an importance metric for each of the selected documents based on the score of each of the selected documents; and
- generating the body of the respective pseudo-document based on document identifiers of the selected documents and importance metrics of the selected documents.

10. The method of claim 9, wherein generating the identifier of the respective pseudo-document includes combining a representation of the basis query and a representation of the ranking function.

11. The method of claim 1, wherein each of the basis queries in the first set of basis queries includes one or more terms and the result includes one or more of the terms from a respective basis query from the first set of basis queries.

12. The method of claim 11, wherein at least one of the terms includes a document identifier of a document.

13. The method of claim 1, wherein:
- the result includes a representation of a second document that was retrieved by re-executing a respective basis query from the first set of basis queries on the set of documents; and
- the second document is distinct from the first document.

14. The method of claim 13, wherein:
- the respective basis query was used in conjunction with a respective ranking function to generate a respective pseudo-document in the first set of pseudo-documents; and
- re-executing the respective basis query includes re-executing the basis query on the first set of documents using the respective ranking function.

15. The method of claim 1, wherein the result is an intermediate result that includes a representation of second document from the set of documents, and the method further comprises:
- after generating the intermediate result, executing a second document-query that includes a representation of the second document; and
- in response to executing the second document-query:
  - identifying a second set of one or more pseudo-documents that include representations of at least one document having a predefined relationship to the second document; and
  - generating a result that is based on the second set of one or more pseudo-documents.

16. A search system, comprising:
- one or more processors;
- memory; and
- one or more programs, wherein the one or more programs are stored in the memory and configured to be executed by the one or more processors, the one or more programs including instructions for:
  - obtaining a plurality of pseudo-documents for a set of documents, wherein each pseudo-document in the plurality of pseudo-documents:
    - corresponds to a respective set of search results generated by executing a respective basis query over the set of documents; and
    - includes document identifiers for one or more documents in the respective set of search results;
  - generating an index of the plurality of pseudo-documents, wherein the index provides an indication, for each of a plurality of respective documents from the set of documents, of the pseudo-documents that include a document identifier for the respective document;
  - after generating the index, receiving a first document-query that includes a representation of a first document from the set of documents; and
  - in response to receiving the first document-query:
    - identifying, using the index, a first set of one or more pseudo-documents that include a document identifier of at least one document having a predefined relationship to the first document;
    - identifying a first set of basis queries corresponding to pseudo-documents in the first set of one or more pseudo-documents; and
    - generating a result that is based on the first set of basis queries.

17. The system of claim 16, wherein each of the basis queries in the first set of basis queries includes one or more terms and the result includes one or more of the terms from a respective basis query from the first set of basis queries.

18. The system of claim 16, wherein:
- the result includes a representation of a second document that was retrieved by re-executing a respective basis query from the first set of basis queries on the set of documents; and
- the second document is distinct from the first document.

19. A non-transitory computer readable storage medium storing one or more programs, the one or more programs comprising instructions, which when executed by a search system with memory and one or more processors, cause the search system to:
- obtain a plurality of pseudo-documents for a set of documents, wherein each pseudo-document of the plurality of pseudo-documents;
  - corresponds to a respective set of search results generated by executing a respective basis query over the set of documents; and
  - includes document identifiers for one or more documents in the respective set of search results;
- generate an index of the plurality of pseudo-documents, wherein the index provides an indication, for each of a plurality of respective documents from the set of documents, of the pseudo-documents that include a document identifier for the respective document;
- after generating the index, receive a first document-query that includes a representation of a first document from the set of documents; and
- in response to receiving the first document-query:
  - identify, using the index, a first set of one or more pseudo-documents that include a document identifier of at least one document having a predefined relationship to the first document;
  - identify a first set of basis queries corresponding to pseudo-documents in the first set of one or more pseudo-documents; and
  - generate a result that is based on the first set of basis queries.

20. The non-transitory computer readable storage medium of claim 19, wherein:
- the result includes a representation of a second document that was retrieved by re-executing a respective basis query from the first set of basis queries on the set of documents; and
- the second document is distinct from the first document.

21. The non-transitory computer readable storage medium of claim 19, wherein each of the basis queries in the first set of basis queries includes one or more terms and the result includes one or more of the terms from a respective basis query from the first set of basis queries.

* * * * *